US012715656B2

(12) United States Patent
Oliveira

(10) Patent No.: US 12,715,656 B2
(45) Date of Patent: Aug. 25, 2026

(54) CARTON WITH DISPENSER

(71) Applicant: Graphic Packaging International, LLC, Atlanta, GA (US)

(72) Inventor: Steven M. Oliveira, Canton, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 238 days.

(21) Appl. No.: 18/437,312

(22) Filed: Feb. 9, 2024

(65) Prior Publication Data

US 2024/0270446 A1 Aug. 15, 2024

Related U.S. Application Data

(60) Provisional application No. 63/444,675, filed on Feb. 10, 2023.

(51) Int. Cl.

*B65D 5/66* (2006.01)
*B31B 50/26* (2017.01)
*B65D 3/00* (2006.01)
*B65D 25/40* (2006.01)

(52) U.S. Cl.

CPC .............. *B65D 25/40* (2013.01); *B31B 50/26* (2017.08); *B65D 3/00* (2013.01)

(58) Field of Classification Search

CPC ... B65D 5/16; B65D 5/66; B65D 5/72; B65D 73/04; B65D 25/40; B65D 25/42; B65D 25/46; B65D 3/00; B31B 50/26

See application file for complete search history.

(56) References Cited

U.S. PATENT DOCUMENTS 2,886,232 A * 5/1959 Leone .................... B65D 5/722 229/122.1
4,194,632 A 3/1980 Dutcher
4,199,063 A 4/1980 Dutcher
(Continued)

FOREIGN PATENT DOCUMENTS

JP 09-249218 A 9/1997
JP 09-254968 A 9/1997
(Continued)

OTHER PUBLICATIONS

International Search Report and Written Opinion for PCT/US2024/015098 dated Jun. 7, 2024.

*Primary Examiner* — Leslie A Nicholson, III

(74) *Attorney, Agent, or Firm* — Andrew N. Claerbout; FisherBroyles, LLP

(57) ABSTRACT

A carton for holding at least one article includes a plurality of panels extending at least partially around an interior of the carton and including a front panel, a back panel, at least one side panel, a first top panel, and a second top panel, a plurality of end flaps including at least one hinge end flap foldably connected to the first top panel, and a reconfigurable dispenser including the first top panel, the second top panel, and the at least one hinge end flap, the reconfigurable dispenser is reconfigurable between a first and second configurations, the at least one hinge end flap for being positioned in the interior of the carton when the reconfigurable dispenser is in the first configuration, the at least one hinge end flap for being at least partially withdrawn from the interior of the carton when the reconfigurable dispenser is in the second configuration.

25 Claims, 6 Drawing Sheets

(56) References Cited

U.S. PATENT DOCUMENTS

| | | | | |
|---|---|---|---|---|
| 6,227,440 | B1 * | 5/2001 | Hart | B65D 5/744<br>229/117.31 |
| 6,889,892 | B2 * | 5/2005 | Walsh | B65D 5/744<br>229/229 |
| 7,913,897 | B2 * | 3/2011 | Manaige | B65D 5/745<br>229/122 |
| 8,672,214 | B2 * | 3/2014 | Manaige | B65D 5/5425<br>229/230 |
| 9,394,066 | B2 * | 7/2016 | Hengami | B65B 43/08 |
| 10,479,549 | B2 * | 11/2019 | Kearns | B31B 50/52 |
| 11,643,245 | B2 * | 5/2023 | Hengami | B65D 5/0227<br>229/110 |
| 12,116,186 | B2 * | 10/2024 | Pinkstone | B65D 5/727 |
| 12,351,372 | B2 * | 7/2025 | Spitler | B65D 5/721 |

FOREIGN PATENT DOCUMENTS

| | | | |
|---|---|---|---|
| JP | 10-007136 | A | 1/1998 |
| JP | 2000-095240 | A | 4/2000 |

* cited by examiner

CARTON WITH DISPENSER

CROSS-REFERENCE TO RELATED APPLICATION

The present application claims the benefit of U.S. Provisional Patent Application No. 63/444,675, filed on Feb. 10, 2023.

INCORPORATION BY REFERENCE

The disclosure of U.S. Provisional Patent Application No. 63/444,675, filed on Feb. 10, 2023, is hereby incorporated by reference for all purposes as if set forth herein in its entirety.

BACKGROUND

The present disclosure generally relates to cartons for holding and dispensing articles.

SUMMARY

According to one aspect, the disclosure is generally directed to a carton for holding at least one article, the carton comprising a plurality of panels extending at least partially around an interior of the carton, the plurality of panels comprising a front panel, a back panel, at least one side panel, a first top panel, and a second top panel, a plurality of end flaps foldably connected to a respective panel of the plurality of panels, the plurality of end flaps comprising at least one hinge end flap foldably connected to the first top panel, and a reconfigurable dispenser, the reconfigurable dispenser comprising the first top panel, the second top panel, and the at least one hinge end flap, the reconfigurable dispenser is reconfigurable between a first configuration, in which the reconfigurable dispenser at least partially overlies the interior of the carton to provide a closed end of the carton, and a second configuration, in which the reconfigurable dispenser is lifted away from the interior of the carton, the at least one hinge end flap is for being positioned in the interior of the carton when the reconfigurable dispenser is in the first configuration, the at least one hinge end flap for being at least partially withdrawn from the interior of the carton when the reconfigurable dispenser is in the second configuration.

According to another aspect, the disclosure is generally directed to a blank for forming a carton for holding at least one article, the blank comprising a plurality of panels extending at least partially around an interior of the carton formed from the blank, the plurality of panels comprising a front panel, a back panel, at least one side panel, a first top panel, and a second top panel, a plurality of end flaps foldably connected to a respective panel of the plurality of panels, the plurality of end flaps comprising at least one hinge end flap foldably connected to the first top panel, and features for forming a reconfigurable dispenser comprising the first top panel, the second top panel, and the at least one hinge end flap such that, when the carton is formed from the blank, the reconfigurable dispenser is reconfigurable between a first configuration, in which the reconfigurable dispenser at least partially overlies the interior of the carton formed from the blank to provide a closed end of the carton formed from the blank, and a second configuration, in which the reconfigurable dispenser is lifted away from the interior of the carton formed from the blank, the at least one hinge end flap is for being positioned in the interior of the carton formed from the blank when the reconfigurable dispenser is in the first configuration, the at least one hinge end flap for being at least partially withdrawn from the interior of the carton formed from the blank when the reconfigurable dispenser is in the second configuration.

According to another aspect, the disclosure is generally directed to a method of forming a carton for holding at least one article, the method comprising obtaining a blank, the blank comprising a plurality of panels comprising a front panel, a back panel, at least one side panel, a first top panel, and a second top panel, a plurality of end flaps foldably connected to a respective panel of the plurality of panels, the plurality of end flaps comprising at least one hinge end flap foldably connected to the first top panel, positioning the plurality of panels extending at least partially around an interior of the carton, and forming a reconfigurable dispenser comprising the first top panel, the second top panel, and the at least one hinge end flap such that the reconfigurable dispenser is reconfigurable between a first configuration, in which the reconfigurable dispenser at least partially overlies the interior of the carton to provide a closed end of the carton, and a second configuration, in which the reconfigurable dispenser is lifted away from the interior of the carton, the at least one hinge end flap is for being positioned in the interior of the carton when the reconfigurable dispenser is in the first configuration, the at least one hinge end flap for being at least partially withdrawn from the interior of the carton when the reconfigurable dispenser is in the second configuration.

Those skilled in the art will appreciate the above-stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

Cartons according to the present disclosure can accommodate articles of numerous different shapes. For the purpose of illustration and not for the purpose of limiting the scope of the disclosure, the following detailed description describes articles such as food products. Such food products can be provided in discrete or granular portions, e.g., as in snacks, for example, candy, gum, mints, lozenges, chocolate, granola, cereal, nuts, trail mix, raisins, dried fruit, etc. It will be understood that a different type of article such as a different type of food product can be held in cartons according to the present disclosure without departing from the disclosure. It will be further understood that articles other than food products can be held in cartons according to the present disclosure.

In this specification, the terms "lower," "bottom," "upper," and "top" indicate orientations determined in relation to fully erected and upright cartons. As described herein, cartons can be formed from blanks by overlapping multiple panels, portions, and/or end flaps. Such panels, portions and/or end flaps may be designated herein in terms relative to one another, e.g., "first", "second", "third", etc., in sequential or non-sequential reference, without departing from the disclosure.

Figure 1:
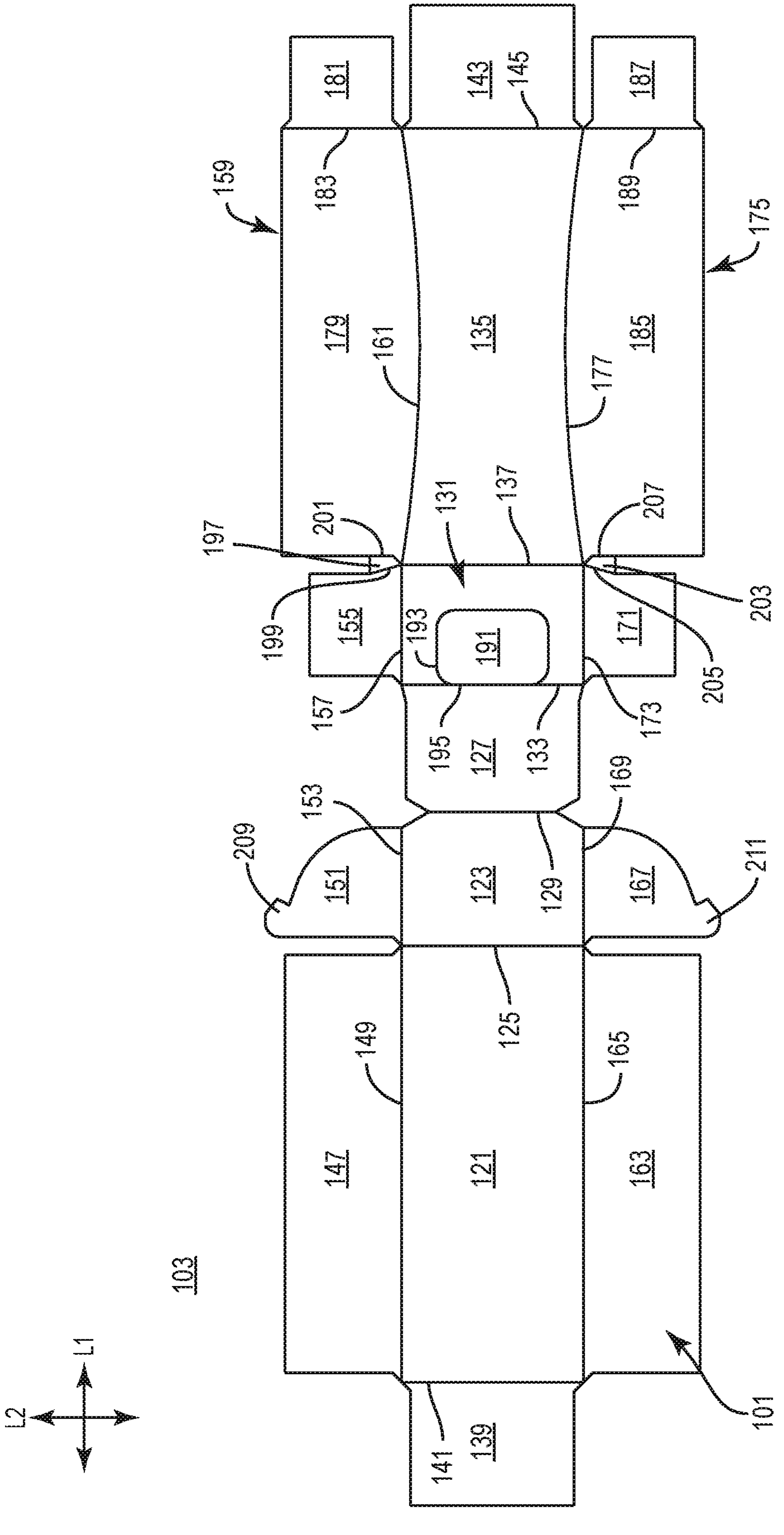
FIG. 1 is a plan view of an exterior surface of a blank used to form a carton according to an exemplary embodiment of the disclosure.

FIG. 1 is a plan view of an exterior surface 101 of a blank, generally indicated at 103, used to form a container or carton 105 (FIG. 3) according to an exemplary embodiment of the disclosure. As described further herein, the carton 105 can be provided with dispenser features forming a reconfigurable dispenser 109 facilitating the metered or selective release of one or more articles A from an interior 107 of the carton 105. As also described further herein, the carton 105 can be provided with access features for reconfiguring an end of the carton 105 between a closed configuration and an at least partially open configuration. In some embodiments, the access features can provide selective access to an end of the carton 105 associated with the dispenser 109.

As shown in FIG. 1, the blank 103 can have a longitudinal axis L1 and a lateral axis L2, and a plurality of panels for extending at least partially around the interior 107 of the carton 105 formed from the blank 103.

In the illustrated embodiment, the plurality of panels of the blank 103 and carton 105 formed therefrom can include a back panel 121, an exterior or first top panel 123 foldably connected to the back panel 121 at a lateral fold line 125, an intermediate or reinforcement or second top panel 127 (broadly, "first top panel" or "third top panel") foldably connected to the first top panel 123 at a lateral fold line 129, an interior or third top panel 131 (broadly, "second top panel") foldably connected to the second top panel 127 at a lateral fold line 133, and a front panel 135 foldably connected to the third top panel 131 at a lateral fold line 137.

The blank 103 can also include a plurality of end flaps foldably connected to a respective panel of the plurality of panels of the blank 103 and carton 105 formed therefrom for forming at least one closed end of the carton 105.

In the illustrated embodiment, the plurality of end flaps can include a first bottom end flap 139 foldably connected to the back panel 121 at a lateral fold line 141, a second bottom end flap 143 foldably connected to the front panel 135 at a lateral fold line 145, a first back side end flap 147 (broadly, "at least one side panel") foldably connected to the back panel 121 at a longitudinal fold line 149, a first hinge end flap 151 foldably connected to the first top panel 123 at a longitudinal fold line 153, a first top end flap 155 foldably connected to the third top panel 131 at a longitudinal fold line 157, a first front side end flap 159 (broadly, "at least one side panel") foldably connected to the front panel 135 at a curved fold line 161, a second back side end flap 163 (broadly, "at least one side panel") foldably connected to the back panel 121 at a longitudinal fold line 165, a second hinge end flap 167 foldably connected to the first top panel 123 at a longitudinal fold line 169, a second top end flap 171 foldably connected to the third top panel 131 at a longitudinal fold line 173, and a second front side end flap 175 (broadly, "at least one side panel") foldably connected to the front panel 135 at a curved fold line 177.

As shown, the side end flap 159 can include a side portion 179 foldably connected to the front panel 135 at the curved fold line 161, and a bottom portion 181 foldably connected to the side portion 179 at a lateral fold line 183. Similarly, the side end flap 175 can include a side portion 185 foldably connected to the front panel 135 at the curved fold line 177, and a bottom portion 187 foldably connected to the side portion 185 at a lateral fold line 189.

As described further herein, the top end flaps 155, 171 can at least partially cooperate with the hinge end flaps 151, 167 to form the reconfigurable dispenser 109 which can provide an open or closed configuration of a top end 111 of the carton 105. In this regard, in some embodiments, the reconfigurable dispenser 109 can have the features of and/or can be considered a reclosable lid of the carton 105 that is provided with dispenser features. Furthermore, the bottom end flaps 139, 143 and the bottom portions 181, 187 of the respective side end flaps 159, 175 can be at least partially overlapped for forming a closed bottom end 113 of the carton 105.

The side end flap 147 and the side portion 179 of the end flap 159 are for being at least partially overlapped to form a first side 115 of the carton 105 and the side end flap 163 and the side portion 185 of the side end flap 175 are for being at least partially overlapped to form a second side 117 of the carton 105. It will be understood that, in some embodiments, the side portions 179, 185 of the respective side end flaps 159, 175 can be considered panels or panel portions for forming the respective sides 115, 117 of the carton 105.

With continued reference to FIG. 1, the plurality of panels of the blank 103 and carton 105 formed therefrom can include a dispenser panel 191 at least partially separably connected to the third top panel 131 at a cut 193 having a generally rounded rectangular configuration and which is interrupted by a fold line 195 at which the dispenser panel 191 is at least partially foldably connected to the second top panel 127 and/or the third top panel 131. As described further herein, the dispenser panel 191 can be at least partially separated from the third top panel 131 for exposing a dispenser opening 110 at least partially defined by the top panel 131 and in communication with the interior 107 of the carton 105 such that one or more articles A can be dispensed from the carton 105.

To facilitate reconfiguration of the dispenser 109 as described herein, the blank 103 and carton 105 formed therefrom can include a stopping tab 197 foldably connected to the top end flap 155 at an oblique fold line 199 and separated from the side portion 179 of the side end flap 159 at a cut 201 having one or more of straight, oblique, and angled portions. Similarly, a stopping tab 203 can be foldably connected to the top end flap 171 at an oblique fold line 205 and separated from the side portion 185 of the side end flap 175 at a cut 207 having one or more of straight, oblique, and angled portions. As described further herein, the stopping tabs 197, 203 can be positioned to at least partially engage/be engaged by respective stopping protrusions 209, 211 protruding from the respective hinge end flaps 151, 167.

As described herein, one or more of the top panels 123, 127, 131, the dispenser panel 191, and the hinge end flaps 151, 167 can be dispenser features of the blank 103 for forming the dispenser 109 of the carton 105, though it will be understood that the dispenser features of the blank 103 and carton 105 formed therefrom can include less than or more than all of these components without departing from the disclosure.

With additional reference to FIGS. 2 and 3, formation of the carton 105 from the blank 103 according to an exemplary embodiment of the disclosure will be described. In one exemplary embodiment, the blank 103 can be inverted, e.g., such that the exterior surface 101 is positioned on a supporting surface and such that an interior surface opposite the exterior surface 101 is positioned facing upwardly.

The first top panel 123 can be folded at the fold line 129 into at least partial face-to-face contact with the second top panel 127. In some embodiments, the back panel 121 can be caried into at least partial face-to-face contact with respective portions of the third top panel 131 and the front panel 135.

The third top panel 131 can be folded at the fold line 133 into at least partial face-to-face contact with the second top panel 127 (e.g., such that the exterior surface of the third top panel 131 is positioned in at least partial face-to-face contact with the exterior surface of the second top panel 127).

In such an arrangement, the top end flap 155 can be positioned in at least partial face-to-face contact with the hinge end flap 151 and with the respective associated fold lines 157, 153 generally aligned, and the top end flap 171 can be positioned in at least partial face-to-face contact with the hinge end flap 167 and with the respective associated fold lines 173, 169 generally aligned. Accordingly, the end flaps 155, 151 can be folded at the aligned fold lines 156, 153 into generally perpendicular relation extending away from the top panels 123, 127, 131 for being positioned in the interior 107 of the carton 105, and the end flaps 171, 167 can be folded at the aligned fold lines 173, 169 into generally perpendicular relation extending away from the top panels 123, 127, 131 for being positioned in the interior 107 of the carton 105.

The side end flaps 147, 159 can be folded at the respective fold lines 149, 161 into at least partial face-to-face contact to form the first side 115 of the carton 105, and the side end flaps 163, 175 can be folded at the respective fold lines 165, 177 into at least partial face-to-face contact to form the second side 117 of the carton 105.

The side end flaps 163, 175, during the aforementioned movement, can contact the respective stopping tabs 197, 203 and cause the stopping tabs 197, 203 to at least partially fold relative to the respective top end flaps 155, 171 at the respective fold lines 199, 205 such that the stopping tabs 197, 203 are positioned generally overlapping the front panel 135 in the interior 107 of the carton 105.

Figure 2:
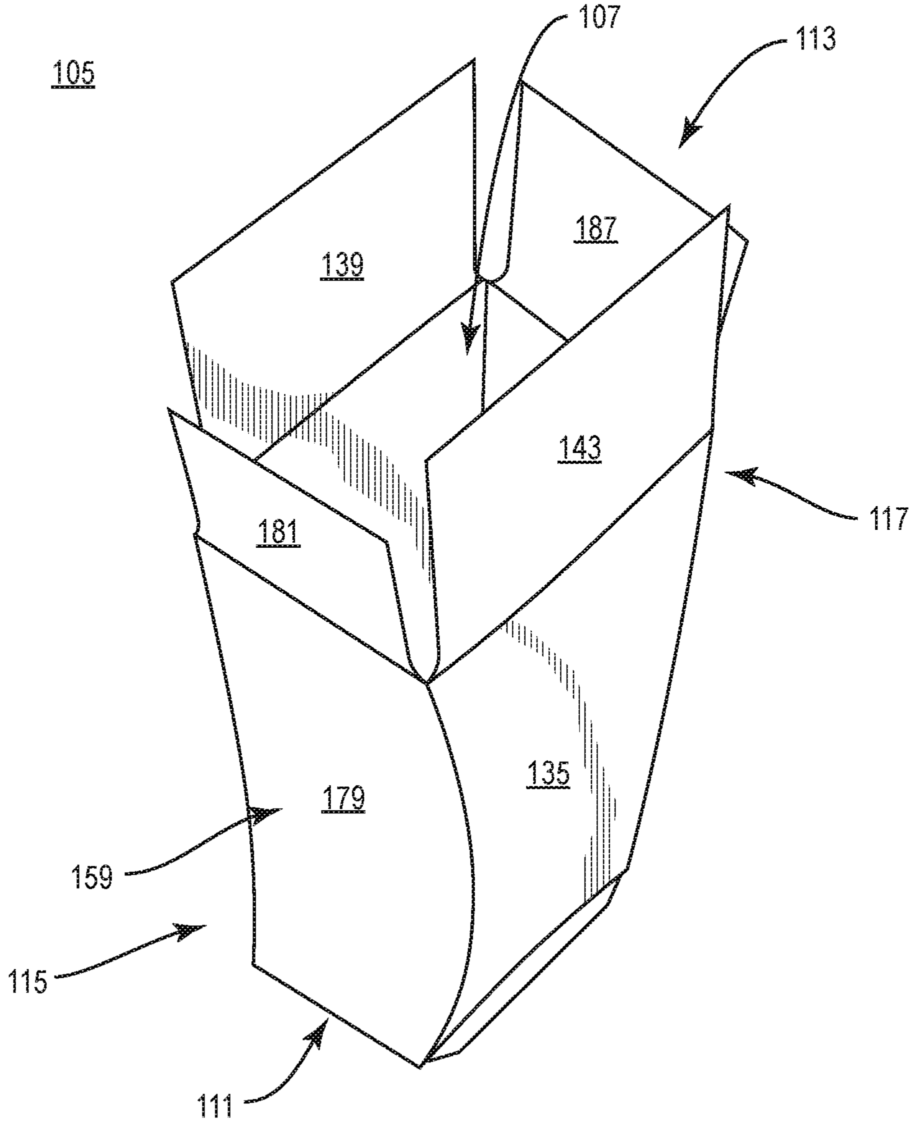
FIG. 2 is a perspective view of a carton formed form the blank of FIG. 1 with a bottom end in an open configuration according to an exemplary embodiment of the disclosure.

In the arrangement shown in FIG. 2, one or more articles A can be inserted into the interior 107 of the carton 105 prior to overlapping the bottom end flaps 139, 143 and bottom portions 181, 187 of the end flaps 159, 175 to form the closed end 113 of the carton 105. Thereafter, the bottom portions 181, 183 of the respective end flaps 159, 175 can be folded at the respective fold lines 183, 189 into generally perpendicular relation with the panels 121, 135 and sides 115, 117 of the carton 105, and the bottom end flaps 139, 143 can be folded at the respective fold lines 141, 145 into at least partial overlapping relation and in generally perpendicular relation with the panels 121, 135 and sides 115, 117 of the carton 105 to form the closed end 113 of the carton 105.

It will be understood that the aforementioned arrangement of panels and end flaps can be at least partially maintained, in some embodiments, by one or more applications of an adhesive such as glue. In the illustrated embodiment, an application of glue can be provided on the exterior surface of the top panel 127 and/or the dispenser panel 191 such that the top panel 127 is adhered to the dispenser panel 191.

Figure 3:
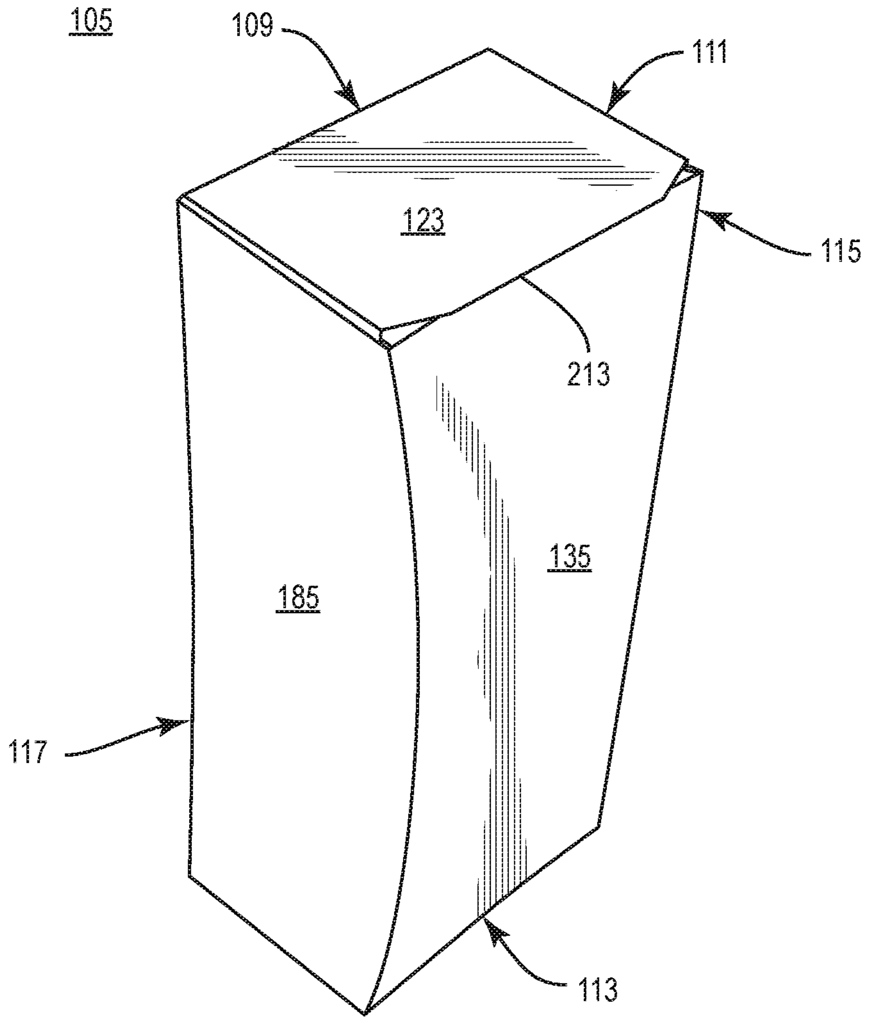
FIG. 3 is a perspective view of a carton formed from the blank of FIG. 1 in a closed configuration according to an exemplary embodiment of the disclosure.

An initial or first or closed configuration of the carton 105 is illustrated in FIG. 3, in which the dispenser 109 is positioned generally overlapping the interior 107 of the carton 105 and restricting access thereto, such that the dispenser 109 is configured as a lid to provide a closed configuration of the top end 111 of the carton 105. In the illustrated embodiment, one or more portions of the top panels 123, 127, e.g., proximate the fold line 129, can protrude outwardly past the front panel 135 to provide a user engagement tab or user engagement feature 213.

Figure 4:
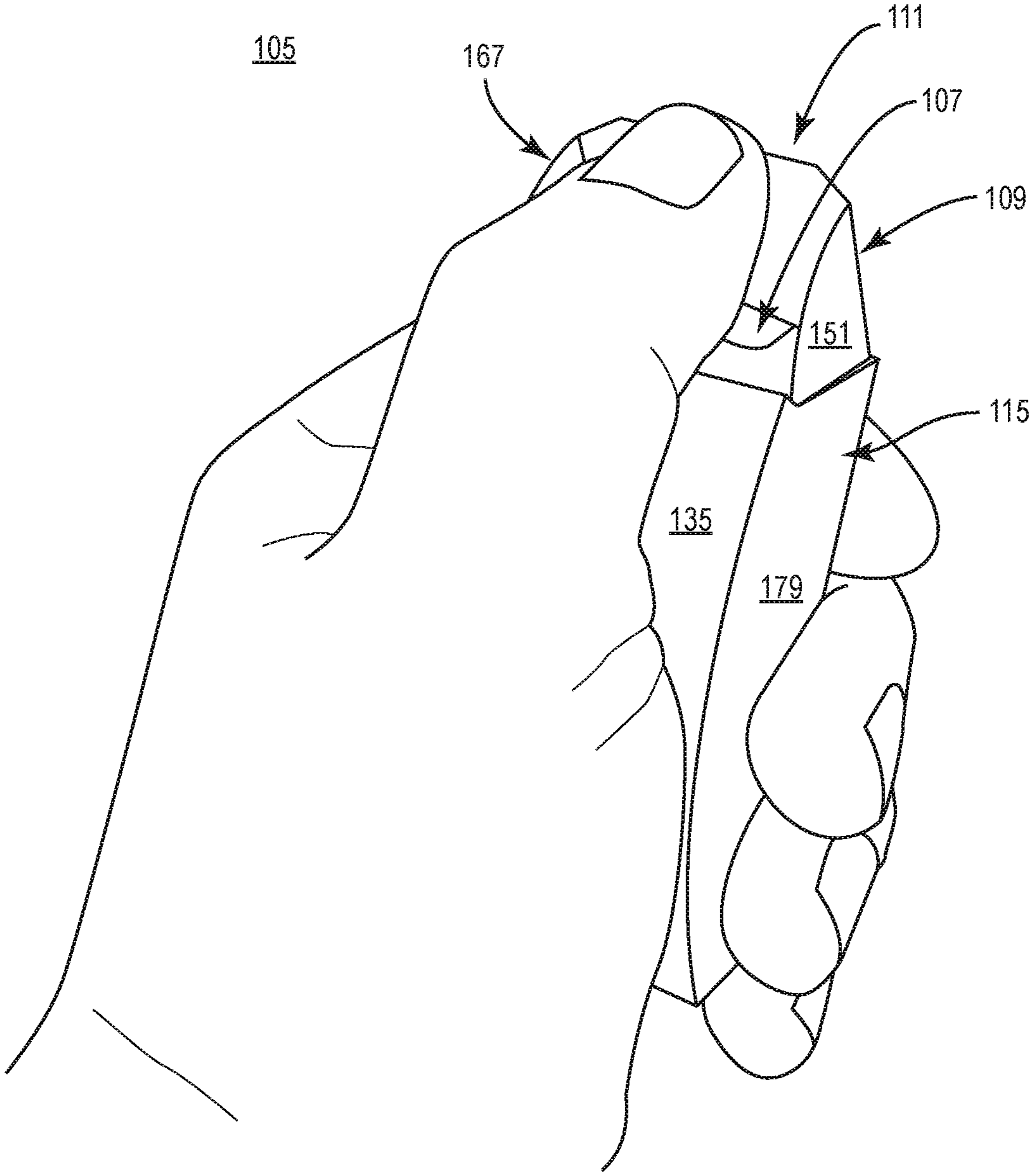
FIG. 4 is a perspective view showing a user opening a dispenser of a carton formed from the blank of FIG. 1 according to an exemplary embodiment of the disclosure.
Figure 5:
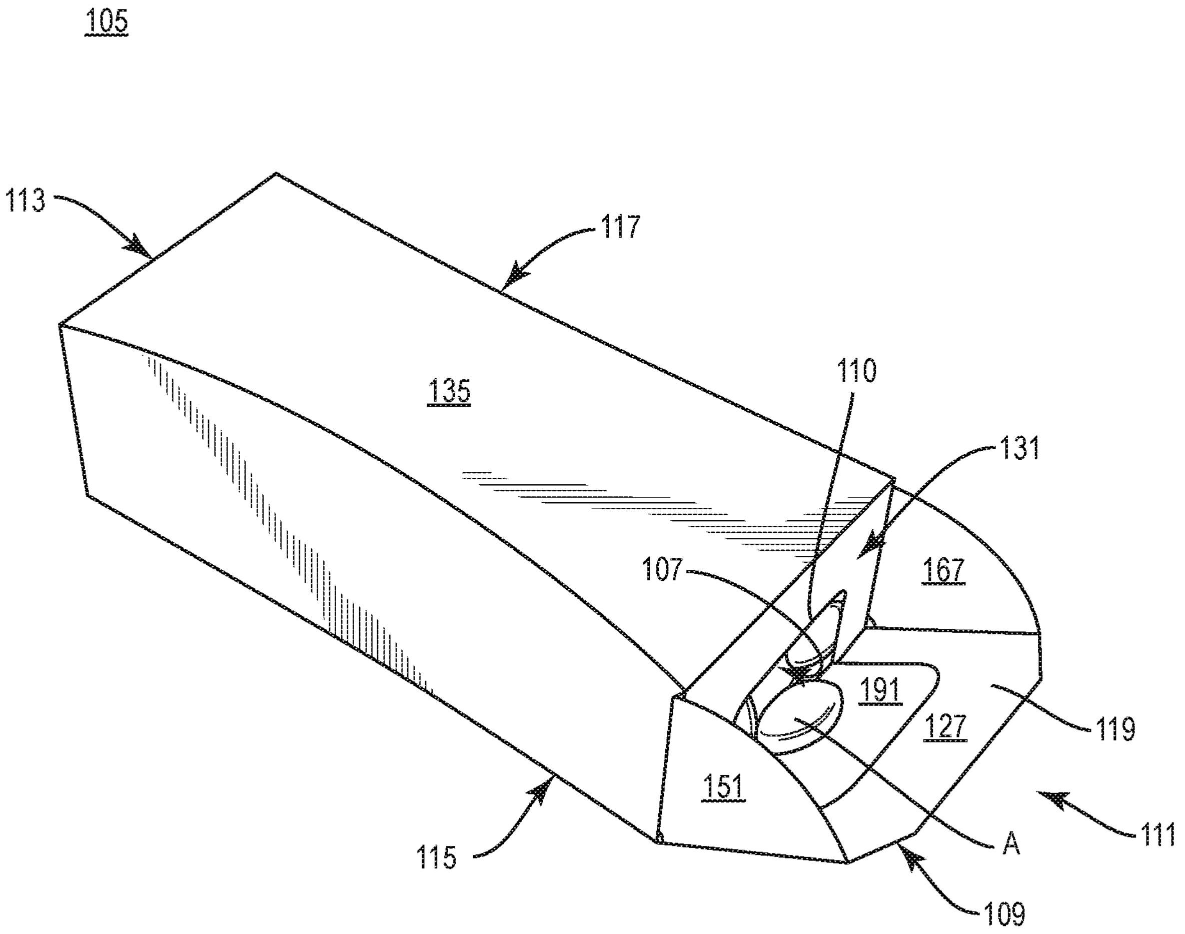
FIG. 5 is a perspective view showing a carton formed from the blank of FIG. 1 dispensing articles according to an exemplary embodiment of the disclosure.

With additional reference to FIGS. 4 and 5, in order to reconfigure the dispenser 109 from the first configuration to an at least partially open configuration, e.g., such that the dispenser 109 is lifted away from at least the front panel 135 of the carton 105 to provide access to the interior 107 of the carton 105, a user can press an edge of the top panels 123, 127, e.g., at the user engagement feature 213 or otherwise proximate the fold line 129, upwardly to raise the top panels 123, 127 away from the front panel 135 and sides 115, 117 of the carton 105, the top panels 123, 127 hingeably connected to the back panel 121 at the fold line 125.

As the top panels 123, 127 raise upwardly, the top panel 127, having been adhered to the dispenser panel 191, can pull the dispenser panel 191 to at least partially separate from the top panel 131 at the cut 193 and to foldably raise at the fold line 195 with the top panels 123, 127. In this regard, upon raising of the top panels 123, 127 as described above, the dispenser opening 110 can be exposed in the top panel 131.

Furthermore, such movement of the top panels 123, 127 can cause the hinge end flaps 151, 157 to which they are foldably connected, respectively, to slidably withdraw from the interior 107 of the carton 105 along a path of motion at least partially guided by the curved free edges thereof as they slide between respective portions of the top panel 131 and respective sides 115, 117 of the carton 105. Upon movement of the free edges of the top panels 123, 127 a predetermined or preselected distance from a top edge of the front panel 135, the stopping projections 209, 211 of the respective hinge end flaps 151, 167 can be positioned to at least partially receive and/or engage one or more surfaces or edges of the stopping tabs 197, 203 in the interior 107 of the carton 105 when the dispenser 109 is in the second configuration so as to inhibit further movement of the top panels 123, 127 away from the front panel 135 and sides 115, 117 of the carton 105.

Such a second configuration of the dispenser 109 is illustrated in FIG. 5, in which the top end 111 of the carton 105 has an at least partially open configuration. In such an arrangement, the top panels 123, 127 and the dispenser panel 191 attached thereto are positioned extending away from the top panel 131 and dispenser opening 110, with the hinge end flaps 151, 167 extending generally perpendicularly upwardly thereto to provide a dispensing region 119 at least partially defined therebetween in which a desired amount of articles A can be collected upon exiting the carton 105 (e.g., subsequent to tilting and/or shaking thereof by a user) through the dispenser opening 110, and from which individual or plural articles A can be grasped by a user or saved for later use, and/or from which a plurality of articles A can be smoothly and conveniently transferred to the palm of a user's hand or user's fingers, e.g., without spillage thereof.

In this regard, the hinge end flaps 151, 167 can be positioned in the interior 107 of the carton 105 when the dispenser 109 is in the first configuration, and can be at least partially withdrawn from the interior 107 of the carton 105 when the dispenser 109 is in the second configuration. Furthermore, the dispenser panel 191 can at least partially cover the dispenser opening 110 when the dispenser 109 is in the first configuration, and can at least partially expose the dispenser opening 110 when the dispenser 109 is in the second configuration.

When it is desired to reconfigure the dispenser 109 from the second configuration to the first configuration, e.g., when access to articles A from the interior 107 of the carton 105 is no longer needed or desired, the top end panels 123, 127 can be pressed downwardly by a user such that the top end panels 123, 127 and the dispenser panel 191 carried therewith pivot downwardly relative to the back panel 121 at the fold line 125 to at least partially overlie the dispenser opening 110 and the interior 107 of the carton 105 to provides a closed configuration of the top end 111 of the carton 105.

In this regard, the carton 105 is provided with dispenser features for forming a dispenser 109 that is reconfigurable from a first configuration at least partially overlying an interior 107 of the carton 105 to provide a closed configuration of a top end 111 of the carton 105, to a second configuration, in which the dispenser 109 is lifted at least partially away from the interior 107 of the carton 105 to provide an open configuration of the top end 111 of the carton 105 as well as to provide a convenient dispenser region or spout by which one or more articles A can be smoothly and conveniently dispensed from the carton 105.

Such an arrangement is reclosable in that the dispenser 109 can be reconfigured from the second configuration to the first configuration such that the interior 107 of the carton 105 can be selectively re-covered by the dispenser 109, e.g., so as to maintain one or more properties of remaining articles A in the interior 107 of the carton 105 (e.g., freshness, taste, flavor, texture, moisture content, etc.), to protect such articles A from environmental elements such as debris, rain, pests, etc., and or to avoid spillage of such articles A during storage or transport, to name a few.

Furthermore, the curved profile of the front portion of the carton 105, owing to a curvature provided by the curved fold lines 161, 177, provides a convenient, ergonomic, and attractive arrangement by which the carton 105 can be grasped.

Figure 6:
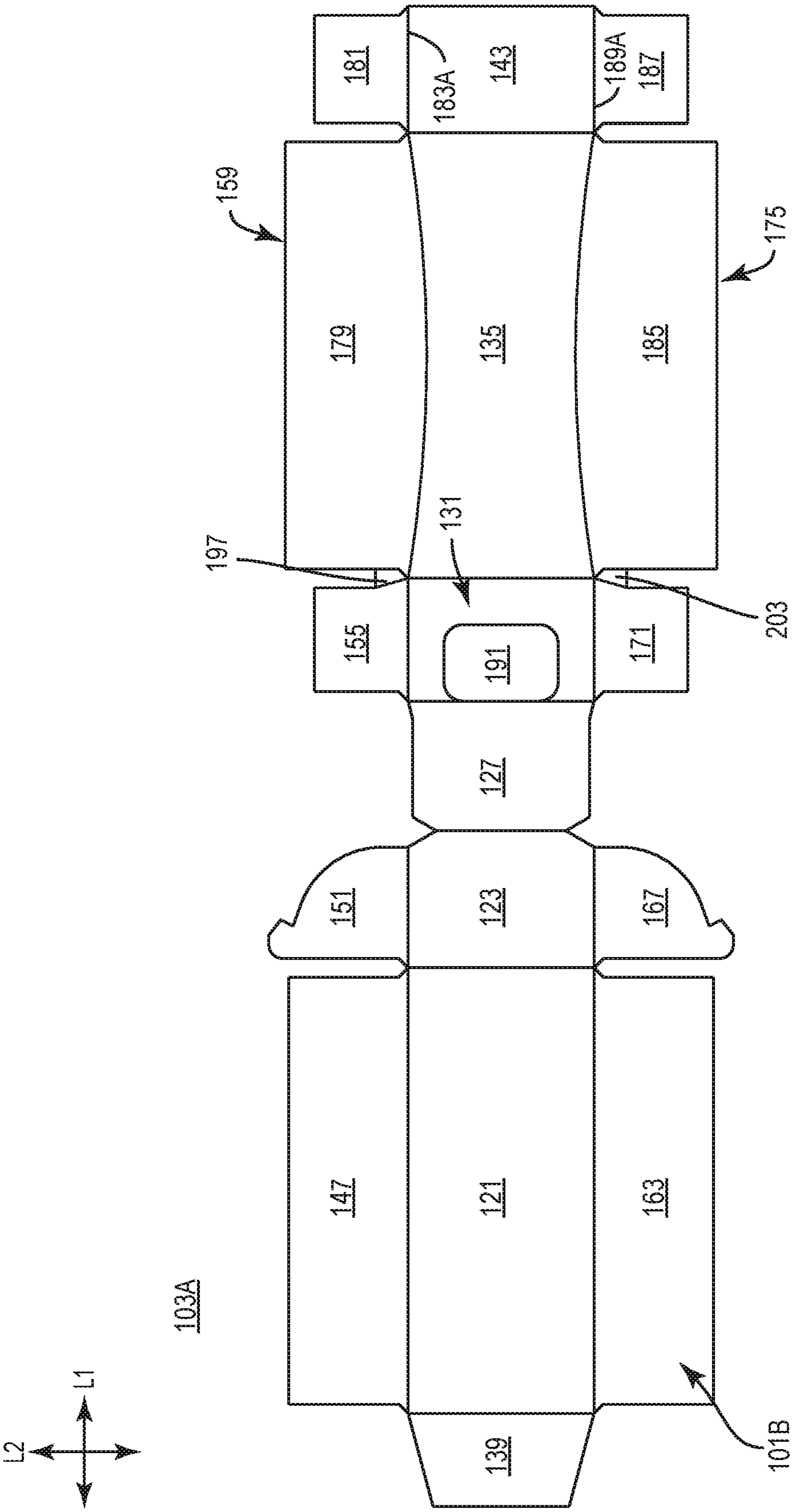
FIG. 6 is a plan view of an exterior surface of a blank used to form a carton according to an alternative exemplary embodiment of the disclosure.

Turning to FIG. 6, the exterior surface 101A of a blank 103A for forming a carton according to an alternative exemplary embodiment of the disclosure is illustrated. The blank 103A and carton formed therefrom can have one or more features that are the same or similar to those described above with respect to the blank 103 and carton 105 formed therefrom, and like or similar features are designated with like or similar reference numerals.

As shown, the blank 103A can have a configuration generally similar to that described above with respect to the blank 103, except that the bottom portions 181, 187 of the respective end flaps 159, 175 are instead foldably connected to the bottom end flap 143 at respective longitudinal fold lines 183A, 189A.

In this regard, a carton can be formed from the blank 103A in a manner generally similar to that described above with respect to the carton 105 to provide similar functionality and advantages.

It will be understood that one or more portions of the blanks and cartons formed therefrom described herein can be differently shaped, configured, arranged, etc., without departing from the disclosure. For example, in some embodiments, generally continuous free edges of a blank and carton formed therefrom can be provided along free edges of the top panels 123, 127 such that no notched are recessed portions are presented therealong.

The blanks according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blanks. In accordance with the above-described embodiments, the blank may be constructed of paperboard of a caliper such that it is heavier and more rigid than ordinary paper. The blanks can also be constructed of other materials, such as cardboard, hard paper, or any other material having properties suitable for enabling the cartons, to function at least generally as described above. The blanks can also be laminated to or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the spaced apart slits to be replaced with a continuous slit, a continuous score, or the like. For example, a cut line can be a continuous slit or could be wider than a slit without departing from the present disclosure. Also, a tear line can be a series of cut scores passing completely, or partially, through the material, that are separated by nicks.

The term "glue" is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton for holding at least one article, the carton comprising:

a plurality of panels extending at least partially around an interior of the carton, the plurality of panels comprising a front panel, a back panel, at least one side panel, a first top panel, and a second top panel;

a plurality of end flaps foldably connected to a respective panel of the plurality of panels, the plurality of end flaps comprising at least one hinge end flap foldably connected to the first top panel; and a reconfigurable dispenser, the reconfigurable dispenser comprising the first top panel, the second top panel, and the at least one hinge end flap, the reconfigurable dispenser is reconfigurable between a first configuration, in which the reconfigurable dispenser at least partially overlies the interior of the carton to provide a closed end of the carton, and a second configuration, in which the reconfigurable dispenser is lifted away from the interior of the carton, the at least one hinge end flap is for being positioned in the interior of the carton when the reconfigurable dispenser is in the first configuration, the at least one hinge end flap for being at least partially withdrawn from the interior of the carton when the reconfigurable dispenser is in the second configuration, the first top panel is foldably connected to the back panel, the second top panel is foldably connected to the front panel, the plurality of panels further comprises a third top panel foldably connected to each of the first top panel and the second top panel.

2. The carton of claim 1, wherein the reconfigurable dispenser is for being reconfigurable to the second configuration such that a dispensing region is at least partially defined between the first top panel, the second top panel, and the at least one hinge end flap.

3. The carton of claim 2, wherein the at least one hinge end flap is slidably positioned between the at least one side panel and the second top panel.

4. The carton of claim 1, wherein the third top panel is in at least partial face-to-face contact with the first top panel.

5. The carton of claim 4, wherein a dispenser opening is at least partially defined in the second top panel.

6. The carton of claim 5, wherein the plurality of panels further comprises a dispenser panel at least partially foldably connected to the second top panel and at least partially separably connected to the second top panel such that the dispenser panel is arranged for at least partially covering the dispenser opening is in the first configuration and such that the dispenser panel is for at least partially exposing the dispenser opening when the reconfigurable dispenser is in the second configuration.

7. The carton of claim 5, wherein the first top panel and the third top panel at least partially define a user engagement feature, the user engagement feature positioned to protrude past the front panel when the reconfigurable dispenser is in the first configuration.

8. The carton of claim 5, wherein the at least one side panel is a first side panel and the plurality of panels further comprises a second side panel, the at least one hinge end flap is a first hinge end flap foldably connected to the first top panel, and the plurality of end flaps further comprises a second hinge end flap foldably connected to the second top panel and slidably positioned between the second top panel and the second side panel.

9. The carton of claim 5, wherein a stopping protrusion extends from the at least one hinge end flap and a stopping tab is foldably connected to the second top panel and positioned in the interior of the carton, the stopping protrusion positioned for contacting the stopping tab when the reconfigurable dispenser is in the second configuration.

10. A blank for forming a carton for holding at least one article, the blank comprising:

a plurality of panels extending at least partially around an interior of the carton formed from the blank, the plurality of panels comprising a front panel, a back panel, at least one side panel, a first top panel, and a second top panel;

a plurality of end flaps foldably connected to a respective panel of the plurality of panels, the plurality of end flaps comprising at least one hinge end flap foldably connected to the first top panel; and features for forming a reconfigurable dispenser comprising the first top panel, the second top panel, and the at least one hinge end flap such that, when the carton is formed from the blank, the reconfigurable dispenser is reconfigurable between a first configuration, in which the reconfigurable dispenser at least partially overlies the interior of the carton formed from the blank to provide a closed end of the carton formed from the blank, and a second configuration, in which the reconfigurable dispenser is lifted away from the interior of the carton formed from the blank, the at least one hinge end flap is for being positioned in the interior of the carton formed from the blank when the reconfigurable dispenser is in the first configuration, the at least one hinge end flap for being at least partially withdrawn from the interior of the carton formed from the blank when the reconfigurable dispenser is in the second configuration, the first top panel is foldably connected to the back panel, the second top panel is foldably connected to the front panel, the plurality of panels further comprises a third top panel foldably connected to each of the first top panel and the second top panel.

11. The blank of claim 10, wherein the third top panel is for being positioned in at least partial face-to-face contact with the first top panel when the carton is formed from the blank.

12. The blank of claim 11, wherein a dispenser opening is at least partially defined in the second top panel.

13. The blank of claim 12, wherein the plurality of panels further comprises a dispenser panel at least partially foldably connected to the second top panel and at least partially separably connected to the second top panel.

14. The blank of claim 12, wherein the at least one side panel is a first side panel and the plurality of panels further comprises a second side panel, the at least one hinge end flap is a first hinge end flap foldably connected to the first top panel, and the plurality of end flaps further comprises a second hinge end flap foldably connected to the second top panel.

15. The blank of claim 12, wherein a stopping protrusion extends from the at least one hinge end flap and a stopping tab is foldably connected to the second top panel and is for being positioned in the interior of the carton formed for the blank, the stopping protrusion positioned for contacting the stopping tab when the reconfigurable dispenser is in the second configuration when the carton is formed from the blank.

16. A method of forming a carton for holding at least one article, the method comprising:

obtaining a blank, the blank comprising a plurality of panels comprising a front panel, a back panel, at least one side panel, a first top panel, and a second top panel, a plurality of end flaps foldably connected to a respective panel of the plurality of panels, the plurality of end flaps comprising at least one hinge end flap foldably connected to the first top panel;

positioning the plurality of panels extending at least partially around an interior of the carton; and forming a reconfigurable dispenser comprising the first top panel, the second top panel, and the at least one hinge end flap such that the reconfigurable dispenser is reconfigurable between a first configuration, in which the reconfigurable dispenser at least partially overlies the interior of the carton to provide a closed end of the carton, and a second configuration, in which the reconfigurable dispenser is lifted away from the interior of the carton, the at least one hinge end flap is for being positioned in the interior of the carton when the reconfigurable dispenser is in the first configuration, the at least one hinge end flap for being at least partially withdrawn from the interior of the carton when the reconfigurable dispenser is in the second configuration, the first top panel is foldably connected to the back panel, the second top panel is foldably connected to the front panel, the plurality of panels further comprises a third top panel foldably connected to each of the first top panel and the second top panel.

17. The method of claim 16, wherein the reconfigurable dispenser is for being reconfigurable to the second configuration such that a dispensing region is at least partially defined between the first top panel, the second top panel, and the at least one hinge end flap.

18. The method of claim 17, further comprising slidably positioning the at least one hinge end flap between the at least one side panel and the second top panel.

19. The method of claim 16, further comprising positioning the third top panel in at least partial face-to-face contact with the first top panel.

20. The method of claim 19, wherein a dispenser opening is at least partially defined in the second top panel.

21. The method of claim 20, wherein the plurality of panels further comprises a dispenser panel at least partially foldably connected to the second top panel and at least partially separably connected to the second top panel such that the dispenser panel is arranged for at least partially covering the dispenser opening is in the first configuration and such that the dispenser panel is for at least partially exposing the dispenser opening when the reconfigurable dispenser is in the second configuration.

22. The method of claim 20, further comprising arranging the first top panel and the third top panel to at least partially define a user engagement feature, the user engagement feature positioned to protrude past the front panel when the reconfigurable dispenser is in the first configuration.

23. The method of claim 20, wherein the at least one side panel is a first side panel and the plurality of panels further comprises a second side panel, the at least one hinge end flap is a first hinge end flap foldably connected to the first top panel, and the plurality of end flaps further comprises a second hinge end flap foldably connected to the second top panel, and the method further comprises slidably positioning the second hinge end flap between the second top panel and the second side panel.

24. The method of claim 20, wherein a stopping protrusion extends from the at least one hinge end flap and a stopping tab is foldably connected to the second top panel, and the method further comprises positioning the stopping protrusion in the interior of the carton such that the stopping protrusion is positioned for contacting the stopping tab when the reconfigurable dispenser is in the second configuration.

25. The method of claim 20, further comprising reconfiguring the reconfigurable dispenser between the first configuration and the second configuration.

* * * * *